Oct. 31, 1933.  C. HORSFIELD  1,933,328
CARD PAIRING DEVICE
Filed June 18, 1930   2 Sheets-Sheet 1
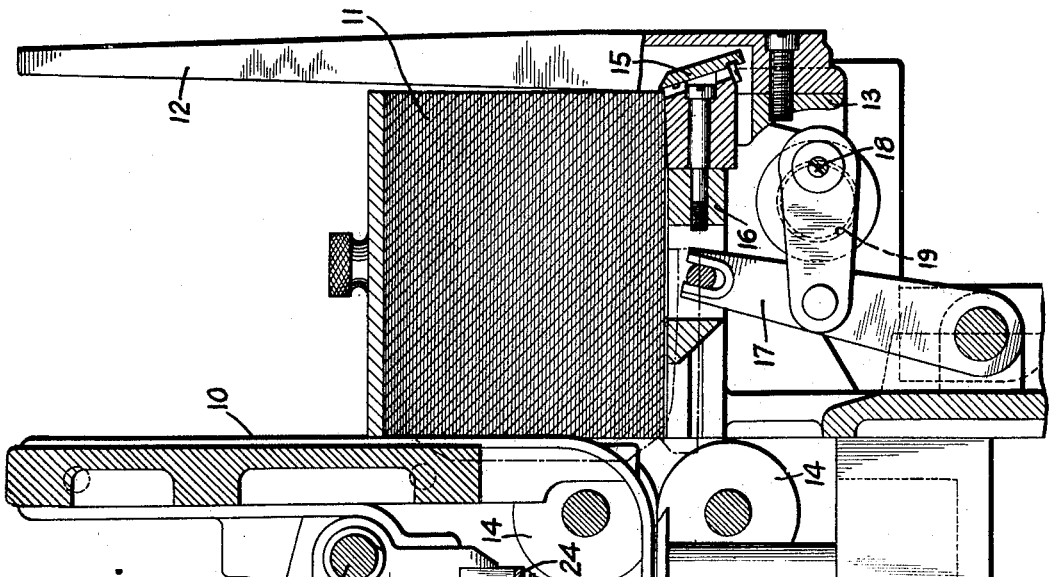
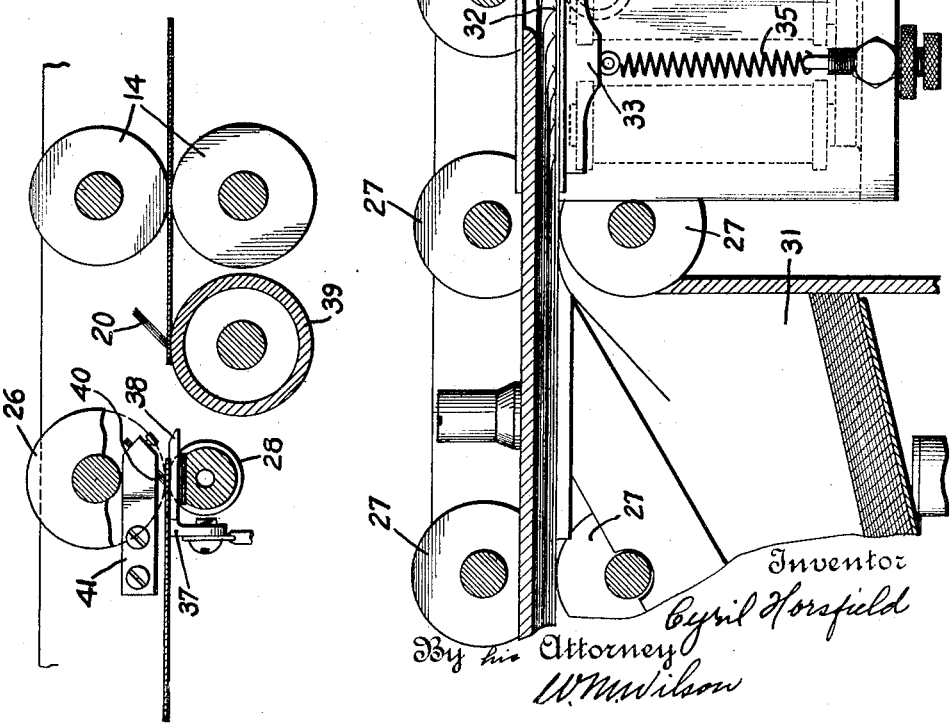
Inventor
Cyril Horsfield
By his Attorney
W. M. Wilson

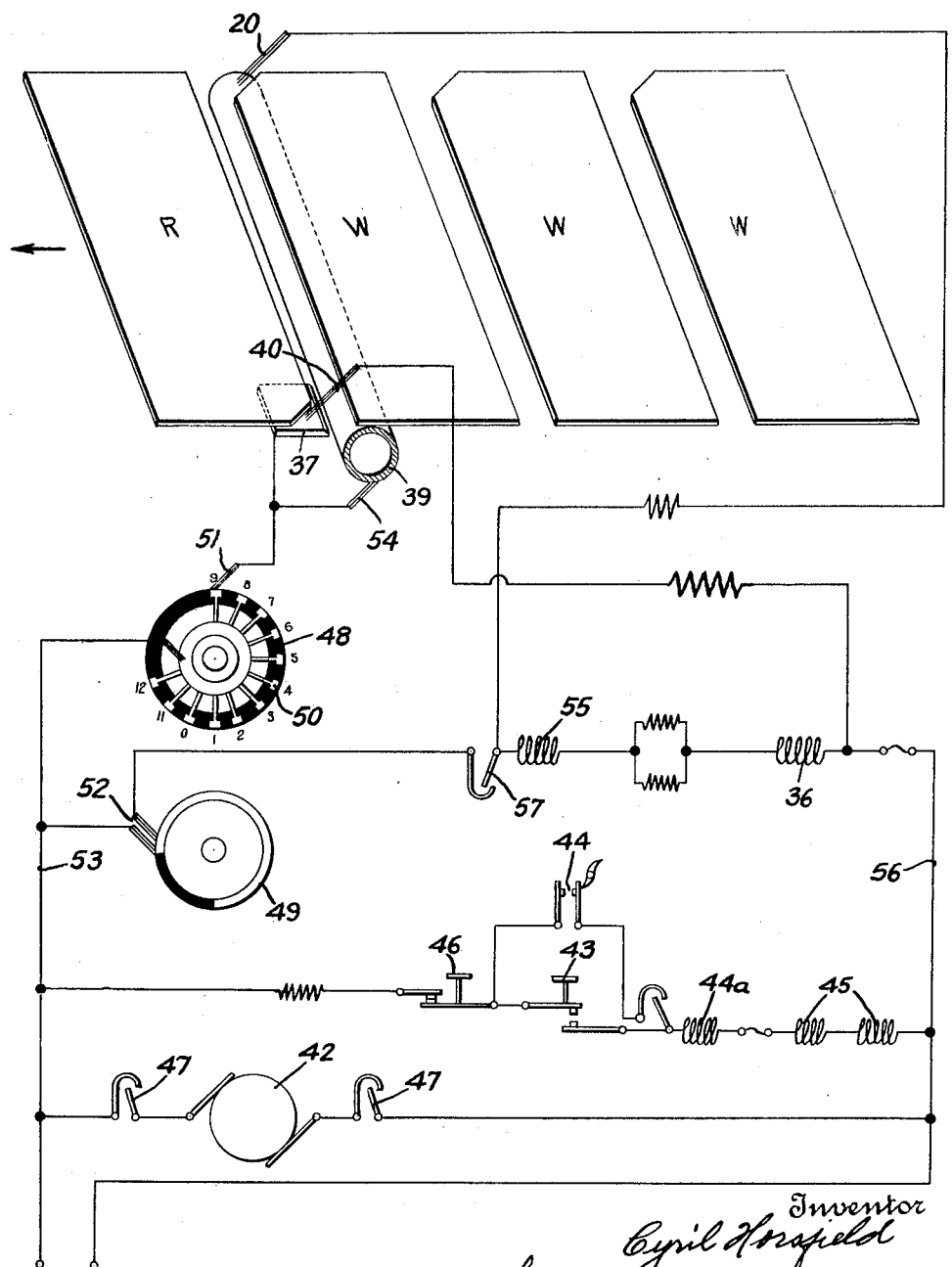

Patented Oct. 31, 1933

1,933,328

UNITED STATES PATENT OFFICE 1,933,328

CARD PAIRING DEVICE

Cyril Horsfield, Toronto, Ontario, Canada, assignor, by mesne assignments, to International Business Machines Corporation, New York, N. Y., a corporation of New York Application June 18, 1930. Serial No. 461,921

8 Claims. (Cl. 209—110)

This invention relates to machines adapted to sort record cards used in tabulating systems such as the well known Hollerith system.

Such systems commonly employ record cards in which the character of the information recorded is indicated by means of index points consisting of punched holes, the index points being punched in vertical columns, certain columns or groups of columns being used to record classification numbers, dates, quantities or amounts or other data according to the purpose for which the cards are to be used.

It is frequently necessary in certain classes of business, such as department stores or banks, for instance, to make duplicate records, each for a different purpose but containing identical or substantially identical information regarding a transaction or operation, the duplicates being either made out simultaneously or at different times after certain events or stages in the transaction or operation have taken place.

This situation may be illustrated by two examples. Business firms using record systems similar to the well known Hollerith system frequently issue bank checks which are adapted to be punched with desired information regarding the particular transaction or operation such as the serial number of the check, the account number, the date of the check, the customer or payee's identification number and any other desired data. When the check is made out a duplicate card is punched simultaneously with and bearing similar data to that on the check. The duplicate card is filed appropriately while the check itself goes to the payee. After the check has been paid and cleared in the usual manner it is returned to the payor by the bank and it becomes necessary to reconcile the accompanying statement issued by the bank with the returned checks and the duplicate records in order to determine the amount of outstanding or unpaid checks. To do this requires that the duplicate record cards be paired or matched with the paid checks in order to separate the record cards representing unpaid checks from the record cards representing paid checks. This procedure is a very tedious and costly process which, in a business issuing a large number of checks monthly, frequently requires the maintenance of a large personnel whose sole duty is to check up the bank statements.

A similar situation exists in businesses like large department stores or chain stores. When stock is issued to different departments or branch stores, a duplicate record is made out by the accounting department on punched cards of the item or items issued to each department or branch store, one of the cards constituting a file card to be kept in the accounting department as a record of stock issued, the other card being delivered with the stock to the department or branch concerned. When the particular item or article has been sold the punched card accompanying the article is returned to the accounting department where it must be matched or paired with the corresponding duplicate. By sorting out the matched pairs and separating them from the cards representing the unsold items or articles the unpaired cards may be tabulated in the usual manner in a tabulating machine like the well-known Hollerith machine and the amount of stock on hand arrived at. Furthermore, by punching the selling price on one or both cards of the matched pairs, they may be similarly tabulated with cost in one column and selling price in another and totals secured which represent total sales and total cost, the difference between the two totals representing profit or loss. Here, as in the first instance, the operation of matching the cards representing sales, returned by the department or branch, with the file duplicates involves considerable time and expense.

The present invention is particularly directed to the provision of novel means whereby the operation of matching such duplicate cards and separating the pairs from single unpaired cards may be very quickly and efficiently accomplished at a lower cost and in a more simple and convenient manner, by utilizing a card sorting machine of the type adapted to be used with the well known Hollerith system of tabulation.

The primary object of the present invention is to provide a simple and efficient arrangement adapted to be attached to a sorting machine of the type generally shown and described in United States Letters Patent No. 1,741,985, granted December 31, 1929, to which reference may be made for a general understanding of the operation of a sorting machine adaptable to utilize the present invention.

Generally speaking, the object of the present invention is to provide an auxiliary brush adapted to cooperate with the main brush for the purpose of rendering the main brush ineffective or inoperative when certain conditions are satisfied in a manner to be more clearly explained hereinafter.

Further objects and advantages of the present invention will be more apparent after a study of the following specification and claims and the accompanying drawings which by way of illustration show what is now considered to be a preferred embodiment of the invention.

In said drawings:

Fig. 1 is a vertical section taken through the card feeding and analyzing mechanism of a sorting machine;

Fig. 2 is a vertical section through the main card feed rollers and the main contact roller and illustrates the relation between the auxiliary brush and the main analyzing brush;

Fig. 3 is a circuit diagram of a sorting machine embodying the present invention.

The numeral 10, Fig. 1, represents generally a magazine adapted to receive the cards 11 which are the well-known perforated record cards used in the Hollerith or a similar system. The cards are retained in their proper position by vertically extending guides 12 attached to the main frame 13 of the machine and are advanced one at a time into a position to be gripped by the feeding rolls 14 by means of a picker blade 15 carried by a reciprocating member 16 adapted to be reciprocated by an arm 17 connected with a crank pin 18 carried by a crank (not shown in the drawings) fast to the shaft 19.

It will be clear that each revolution of shaft 19 will cause the arm 17 to be rocked to the left, (Fig. 1) and thereby move the member 16 so as to successively advance cards 11 toward the feed rollers 14 which thereafter grip the cards and feed them toward the left.

The feed rollers 14 bring each card fed by the member 16 into a position to be traversed or sensed by a brush 20 carried by a brush holder 21. The brush holder 21 is carried by and insulated from a carrier 22 which is adapted to be adjusted by means of a screw 23 extending crosswise of the machine and capable of being turned manually by means of a handle, not shown, so as to bring the brush 20 into a position to sweep over or sense any desired column on the card. The brush 20 is electrically connected to an insulated contact rail 24 extending beneath and parallel with the shaft 23, crosswise of the machine, a suitable spring actuated contact shoe 25 providing means for maintaining the circuit to the brush regardless of the column on the card with which the brush has been brought into cooperative relation. The brush holder 21 and the means for adjusting it to a desired column form no part of the present invention and have been only briefly mentioned herein. For a more detailed description reference may be had to copending application, Serial No. 307,823, filed September 24, 1928, in the name of Eugene A. Ford, which also contains a description of the card feeding mechanism already described.

Before each card leaves the control of the feed rollers 14 it is gripped by rollers 26 while other rollers 27 driven in unison with the feed rollers 14 and 26 serve to carry the cards to the left, the shafts supporting all of these rollers and the shaft 19 being driven in unison by a common shaft, not shown, which is driven by a motor in a well-known manner. The rolls 26 cooperate with smaller rolls 28 which are preferably geared to the rolls 27 to insure a positive grip in the card passing therebetween.

Each card, as it is swept or sensed by the brush 20, moves over a pair of plates 29 mounted in spaced relationship upon the main frame of the machine and the left edge of said card passes underneath the ends of guide blades 30 which lead to suitable receiving stations such as 31 adapted to receive cards having similar index perforations in the column swept by the brush 20. One of the receiving stations is commonly known in the art as the "Reject" station and receives all cards having no perforation in the column being sensed by the brush 20. The ends of the blades are substantially narrowed or reduced in width at their right ends and are bent upwardly as at 32 to permit the cards to slide under the ends of the blades. Each end rests upon a narrow plate formed as part of a spring urged armature 33 which is pivoted on a knife edge formed in the upper edge of a plate 34 mounted upon the machine frame. A spring 35 normally holds the armature away from the poles of the magnets 36 so that the upturned ends 32 of blades 30 are presented to the edge of the card as it is advanced by the rolls 14 toward the left and from beneath the brush 20.

It will be clearly understood from the foregoing that the left edge of the card will pass beneath the upturned ends 32 of each of the blades 30 as the card is advanced to the left by the feed rollers and whenever the brush 20 encounters an index perforation in the column being sensed or analyzed the magnet 36 will be energized and the armature 33 attracted, thereby lowering all of the ends 32 which do not overlie the card. As a result the card analyzed will enter one of the spaces between the ends of the blades 30 and will thereafter be carried to the appropriate receiving station by the rolls 27, according to the position of the index point sensed by the brush 20.

All of the foregoing will be clearly understood by reference to Letters Patent No. 1,741,985, already mentioned, which gives a more detailed description of the construction and operation of the mechanism for diverting the card to the proper receiving station.

Mounted beneath the shaft supporting the rolls 26 is a contact plate 37 (Fig. 2) which is carried by and insulated from the side frame supporting the feeding rollers. The contact plate 37 is somewhat bevelled as at 38 to permit the record card to pass over the contact plate without being impeded in its progress over the plate. The contact plate is placed so that the upper left corner of the card moving over the plates 29 overlies the contact plate at the instant the lower right corner of the card following overlies the end of the contact roll 39. The contact roll 39 is driven in unison with the rolls 26, 27 and the shaft 19 and is preferably insulated from its supporting shaft.

An auxiliary brush 40, supported by an insulated brush holder 41 normally bears in the top surface of the contact plate 37 except when a card is passing over the contact plate. The brush holder may be fastened to the side frame supporting the rollers 26, 27.

In order to understand more clearly the operation of the present invention it will be presumed that it is desired to pair red cards representing an article sold with its white mate or duplicate file copy, the red card being retained with the article sent to one of the departments or branches of a store system such as a department store, the white card being retained in the files of the accounting department. When the article is sent to the department concerned both a red card and a white card are punched to represent the cost, grade, department number, a serial number and any other desired data, in accordance with a predetermined code, each pair of cards being provided with a different serial number.

Prior to performing the mechanical operation of pairing red cards representing articles sold with their corresponding white file duplicates, a normal sorting operating is carried out so as to arrange the red and white cards in order, say by departments, the cards for each department appearing in consecutive order according to the serial number. This is accomplished by placing the red cards in the magazine 10 first and then continuing the sorting with the white cards, for some of which red cards are mates. When the normal sorting operation is complete it will be found that each red card will be lying underneath the mated or paired white card with unmated white cards interspersed with the mated pairs of red and white cards, all being in the desired and predetermined order. During the normal sorting operation for preliminarily preparing the cards for the final sorting operation the auxiliary brush 40 is cut out of circuit and is rendered ineffective, this being accomplished by means of a switch, not shown, inserted in the circuit to the brush 40.

The problem now presented is to select the mated pairs of cards and thereby separate all unpaired cards in the lot, the paired cards going to the "Reject" receiving station while the unpaired cards go to a separate receiving station in a manner about to be described.

In order to accomplish the foregoing operation successfully it is necessary to prepare the red and white cards so as to bring about the proper selection when the cards pass under the brushes. In order to accomplish the desired object the red cards have their upper left hand corners cut so as to be equivalent to punching "12" in the first column of the card on the left hand side thereof while the white cards have their lower right hand corners cut so as to be equivalent to punching "9" in the last or right hand column of the card. For the final sorting operation the brush 20 is set so it sweeps over and senses the last or right hand column of the card while the brush 40 sweeps the first or left hand column.

Fig. 3 illustrates a circuit diagram and also a series of cards which will be understood to be moving toward the left under the influence of the feeding rollers, letters "R" and "W" representing red and white cards respectively. It will be understood that the cards are travelling face down so that the lower edges thereof strike the brush first. The first red card and the following white card are paired while the next two cards are single white cards which have no mates at the time of sorting. The object is to convey the mated pair to one receiving station while the single unmated cards are to go to a separate receiving station.

The numeral 42 represents the motor driving the sorting machine and is started by depressing the key 43 and holding the key depressed until the passage of cards effects closure of the usual card contacts 44. Relays 45 in series with the starting key 43 and stop key 46 close contacts 47 and establish the circuit to the motor 42. A relay 44a, in series with relays 45, establishes a connection to one of the card contacts 44 so that closure of the contacts 44 by the passage of cards under the brushes establishes a circuit around the start key 43 after the cards begin to pass the brushes so that the motor is maintained in operation as long as cards remain in the magazine 10. The foregoing is a well-known circuit and will be readily understood by those skilled in the art and needs no further description herein.

The numeral 48 represents a commutator device similar to that described in Patent No. 1,741,985 and will be readily understood by reference to that patent. The numeral 49 represents a rotary contact which forms part of the commutator 48 and moves in unison therewith, the commutator being driven in synchronism with the feeding rollers.

The contacts 50 are timed so that each comes under the brush 51 at the instant the brush 20 passes over the corresponding index point on the record card while the contact 49 is timed so that it bridges the brushes 52 during the time the brush 51 passes over the contacts 50 but holds the circuit open during the brief interval of time when no card is under the brush 20. It will be understood that when the brush 20 encounters a cut corner on a white card, equivalent to punching a "9" that the "9" commutator bar will be under the brush 51 and a circuit will be established from the left side of the line, the "9" commutator bar, brush 54, contact roll 39, brush 20, relay 55 and magnet 36 to the right side of the line 56. Energization of relay 55 closes contacts 57 thereby establishing a circuit from left side of line 53, brushes 52, contact 49, relay contacts 57 and magnet 36, thus holding the magnet 36 energized until the white card passes from under the brush 20, the contact 49 being timed so it breaks the circuit through the relay 55 just before the upper edge of the card leaves the brush 20. A red card, not having any cut corner on its right edge or perforation in the last column, will have no effect upon the circuit through brush 20 and therefore will not be diverted to one of the receiving stations represented by the numerals "0-12" but will go to the thirteenth or "Reject" receiving station. A white card, on the other hand, since it has a cut corner in the lower left corner would ordinarily be diverted to the "9" receiving station.

The brush 40 is connected to the right side of the line 56 while the contact 37 is connected to brush 51, so that it will be clear that establishment of a circuit from line 53 through the "9" commutator bar, brush 51, contact 37 and brush 40 to line 56 will shunt the magnet 36 and render the magnet ineffective. When a red card representing an article sold is followed by its duplicate white or file copy, the red card will go to the "Reject" receiving station without causing energization of magnet 36, while the following white card will have its lower right cut corner under the brush 20 at the instant the upper left cut corner of the preceding red card comes under the brush 40 so that the magnet 36 will be rendered ineffective thereby preventing the normal sorting action of the magnet and causing the white card to follow the red card into the "Reject" receiving station.

If a white card, either paired or single, is followed by a white card, the upper right full corner of the preceding white card will prevent the establishment of the circuit through brush 40 so that the following white card will be diverted to the "9" box in the usual manner and every succeeding white card will be similarly diverted to the "9" box.

It will be clear from the foregoing description that all red cards will be diverted to the "Reject"

receiving station while all white cards will be conveyed to the "9" box except when a white card is preceded by a red card in which case the white card following the red card will be diverted to the "Reject" receiving station.

A sorting operation such as the above described operation will result in the accumulation in the "9" receiving station of all single white and unpaired record cards while all pairs of red and white cards will be accumulated in the "Reject" box. In the present illustration the white single cards can be run through a tabulating machine and the total stock on hand determined very quickly and readily. The pairs can also be run through a tabulating machine arranged for group control and the cost printed in one column and selling price in another so that the final totals arrived at will represent total cost and total sales, the difference representing a gross profit or loss. Other uses of the present invention will be apparent to those skilled in the tabulating art and it is not deemed necessary to go into further detail hereinafter regarding the various specific uses to which the invention may be put.

It will be clear from the foregoing description of the construction and operation of the present invention that a major share of the tedious operation of selecting out and pairing off duplicate cards is eliminated by means of the present invention and that the invention provides a simple and convenient device which may be easily attached to a sorting machine without requiring extensive alterations in the machine.

Although this invention has been shown and described as applied to a particular apparatus and in a specific manner, it is to be distinctly understood that it is not desired to limit the scope of the invention to the precise embodiment shown and described as various modifications may be made, all within the scope of the claims which follow.

1. In combination with a card sorting machine having sorting mechanism and a card reading device for controlling the sorting mechanism in accordance with the index point value of perforations in the cards, an auxiliary reading device arranged to read conjointly with the first named reading device the configurations of two successively presented cards, both said devices cooperating to control the sorting mechanism whereby to sort out together the pairs of cards having unlike configurations.

2. In combination, a main reading device adapted to read the configurations of successively presented cards, sorting mechanism controlled thereby in accordance with the configuration of said cards and normally operative to sort out in one group all cards having the same configuration, and an auxiliary reading device adapted to read the configurations of said cards immediately after the reading thereof by the main reading device and conjointly with the reading of succeeding cards by the main reading device, said reading devices being jointly effective to control the sorting mechanism to sort out in a different group all pairs of cards having unlike configurations.

3. In combination, means for feeding record cards having corners cut therefrom, said cards being arranged in pairs with inter-mixed single cards, said pairs of cards being identified by having non-corresponding corners cut therefrom, sorting mechanism including a separate pocket for the paired cards, and means for analyzing the shape of a pair of said cards conjointly to detect the presence of a pair of cards having non-corresponding corners cut therefrom and controlling the sorting mechanism to sort said pair of cards into said pocket.

4. In combination, analyzing mechanism for sensing variations in the configuration of successively presented records, sorting mechanism normally operative to distribute the records under control of the analyzing mechanism and in accordance with variations in the configuration of the records, and an auxiliary sensing device adapted to sense the configuration of the records in cooperation with the analyzing mechanism to disable the sorting mechanism when any record is succeeded by a record having a configuration different from the preceding record.

5. In combination, an analyzing device for sensing variations in the configuration of successively presented records, sorting mechanism normally operative to effect a given distribution of records of a predetermined configuration and a different distribution for records having a different configuration, and an auxiliary analyzing device for sensing the configuration of the records and cooperating with the first named device to prevent normal operation of the sorting mechanism when a record having the predetermined configuration is succeeded by a record having a different configuration.

6. In combination, a main analyzing brush adapted to sense the configuration of successively presented records, sorting mechanism controlled by said main brush in accordance with the configuration of the records and having a control circuit, an auxiliary brush arranged to sense the configuration of the records subsequent to the sensing thereof by the main brush and operative to disable said circuit when a record is followed by another record having a configuration different from the first record.

7. In combination, analyzing mechanism adapted to sense the outline of successively presented records; sorting mechanism controlled by the analyzing mechanism and including a pair of sorting passages, said sorting mechanism normally sorting records of a predetermined outline into one of said passages and records of a different outline into the other passage; and an auxiliary analyzing device adapted to sense the outline of the records and control the sorting mechanism to sort a record of different outline succeeding one of the predetermined outline into the passage receiving the record of predetermined outline.

8. In combination with sorting mechanism and an analyzing device for controlling the sorting mechanism, an auxiliary device arranged to sense differences in the configuration of two successively presented records conjointly with the first named device and operative to control the sorting mechanism to sort out the records in pairs according to differences in the configuration of the records.

CYRIL HORSFIELD.